R. A. BEST.
AMUSEMENT DEVICE.
APPLICATION FILED SEPT. 4, 1912.

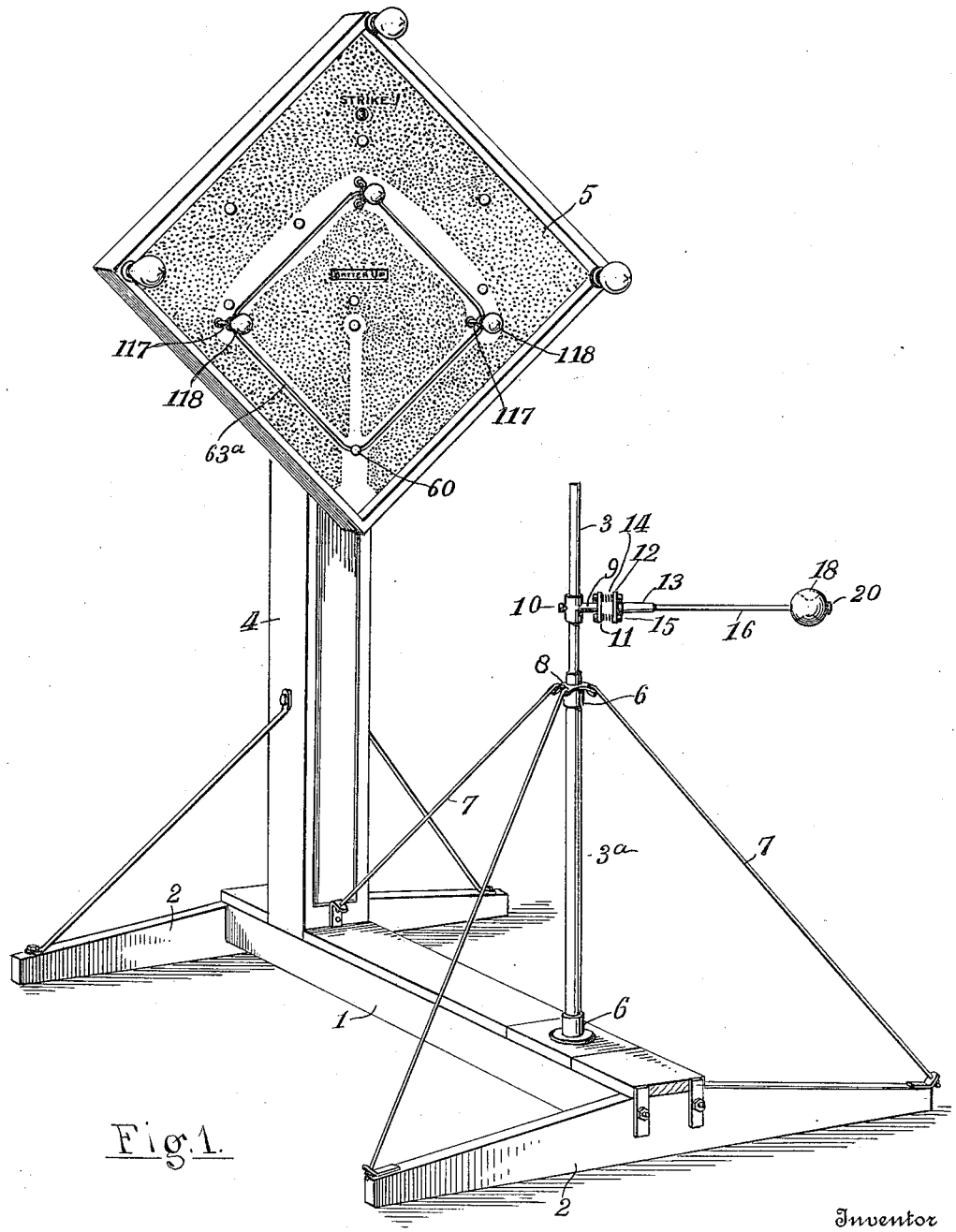

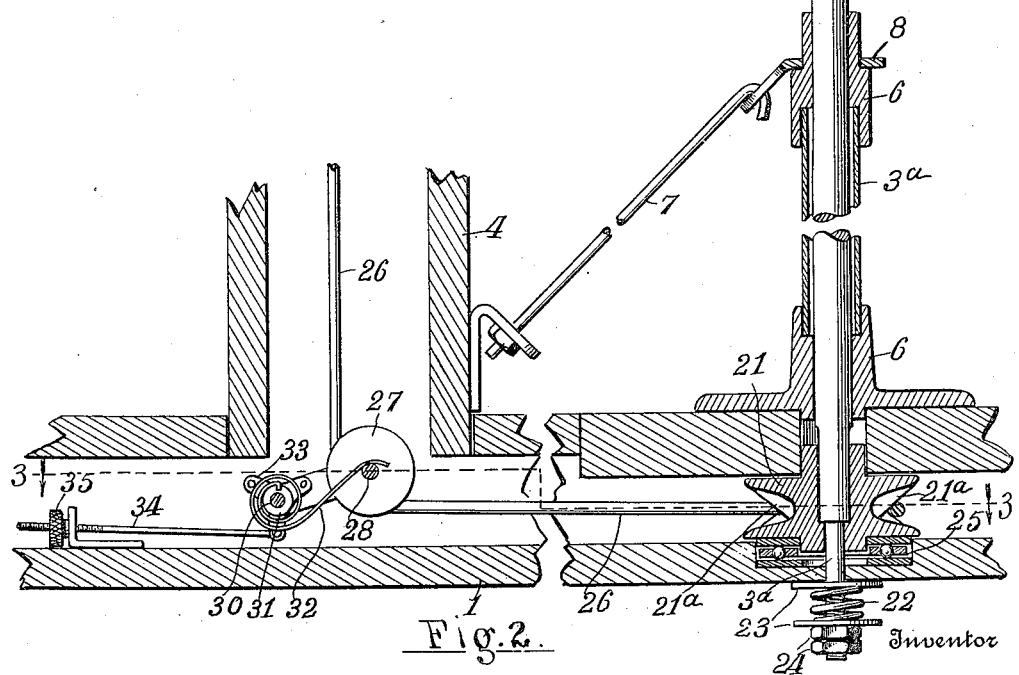

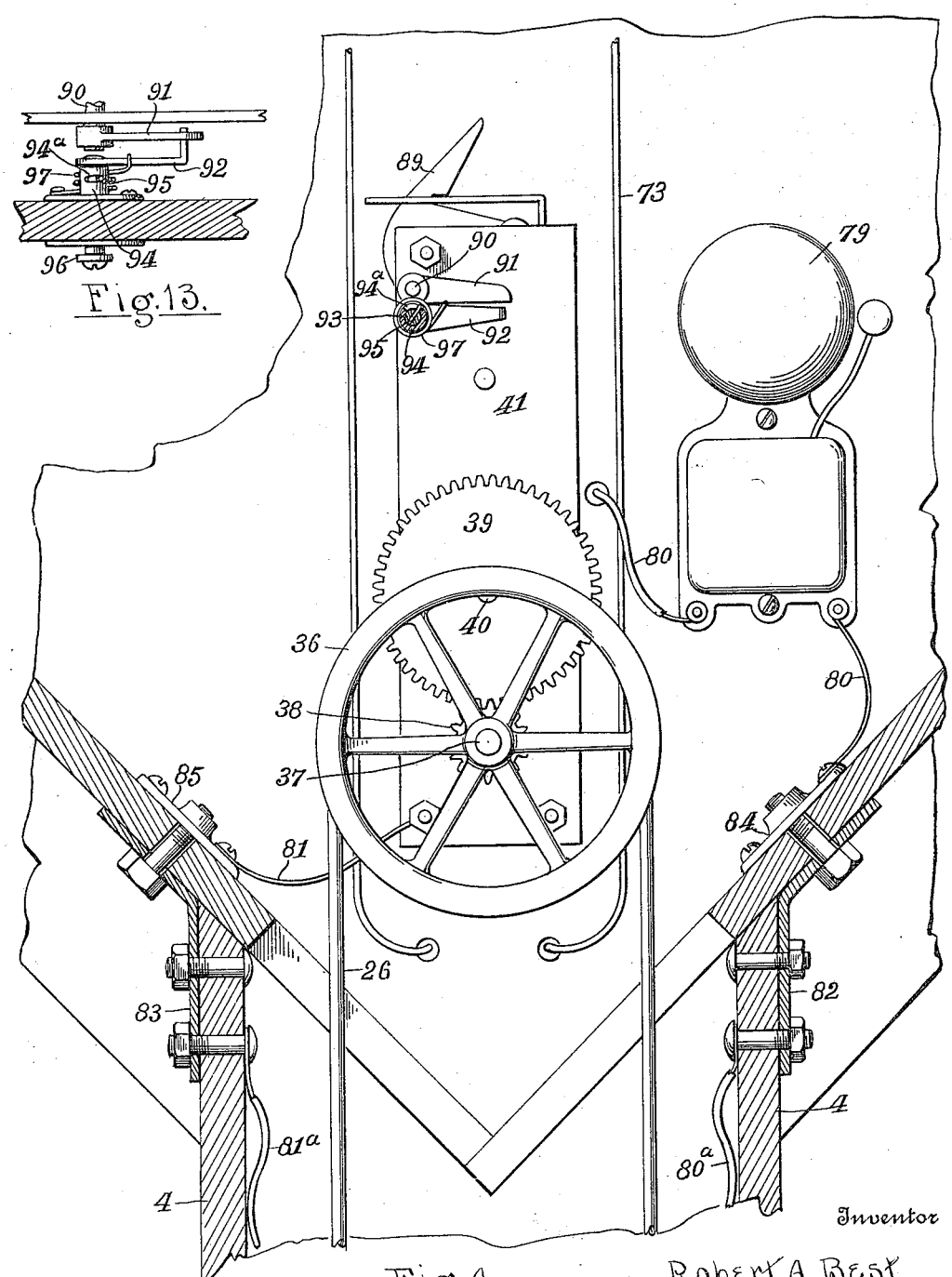

1,069,522.

Patented Aug. 5, 1913.
7 SHEETS—SHEET 4.

Witnesses
Harold O. Van Antwerp
Ray W. Longfield

Inventor
Robert A. Best.
By Luther V. Moulton
Attorney

R. A. BEST.
AMUSEMENT DEVICE.
APPLICATION FILED SEPT. 4, 1912.

1,069,522.

Patented Aug. 5, 1913.
7 SHEETS—SHEET 5.

Witnesses
Harold O. Van Antwerp
Ray W. Longfield

Inventor
Robert A. Best
By Luther V. Moulton
Attorney

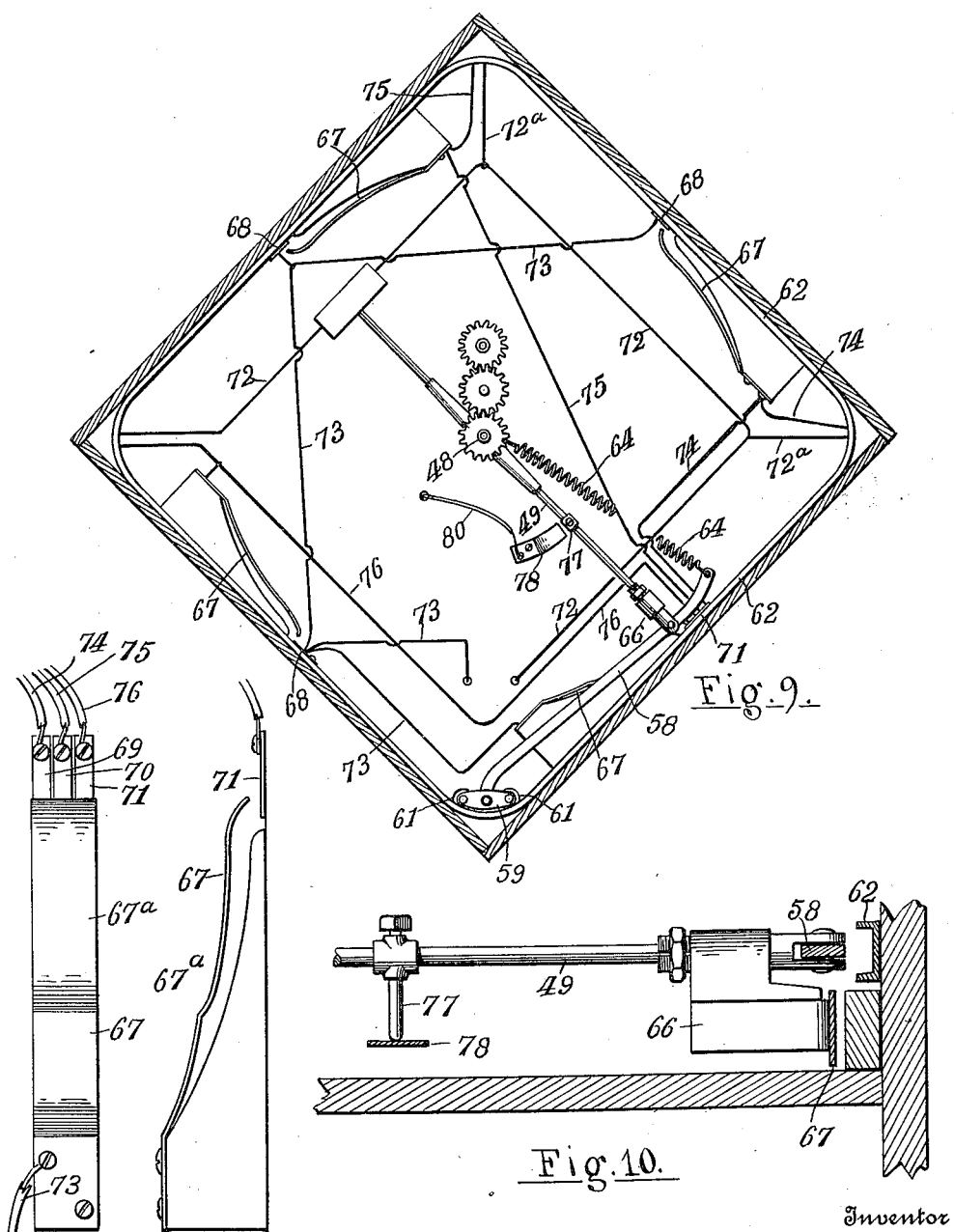

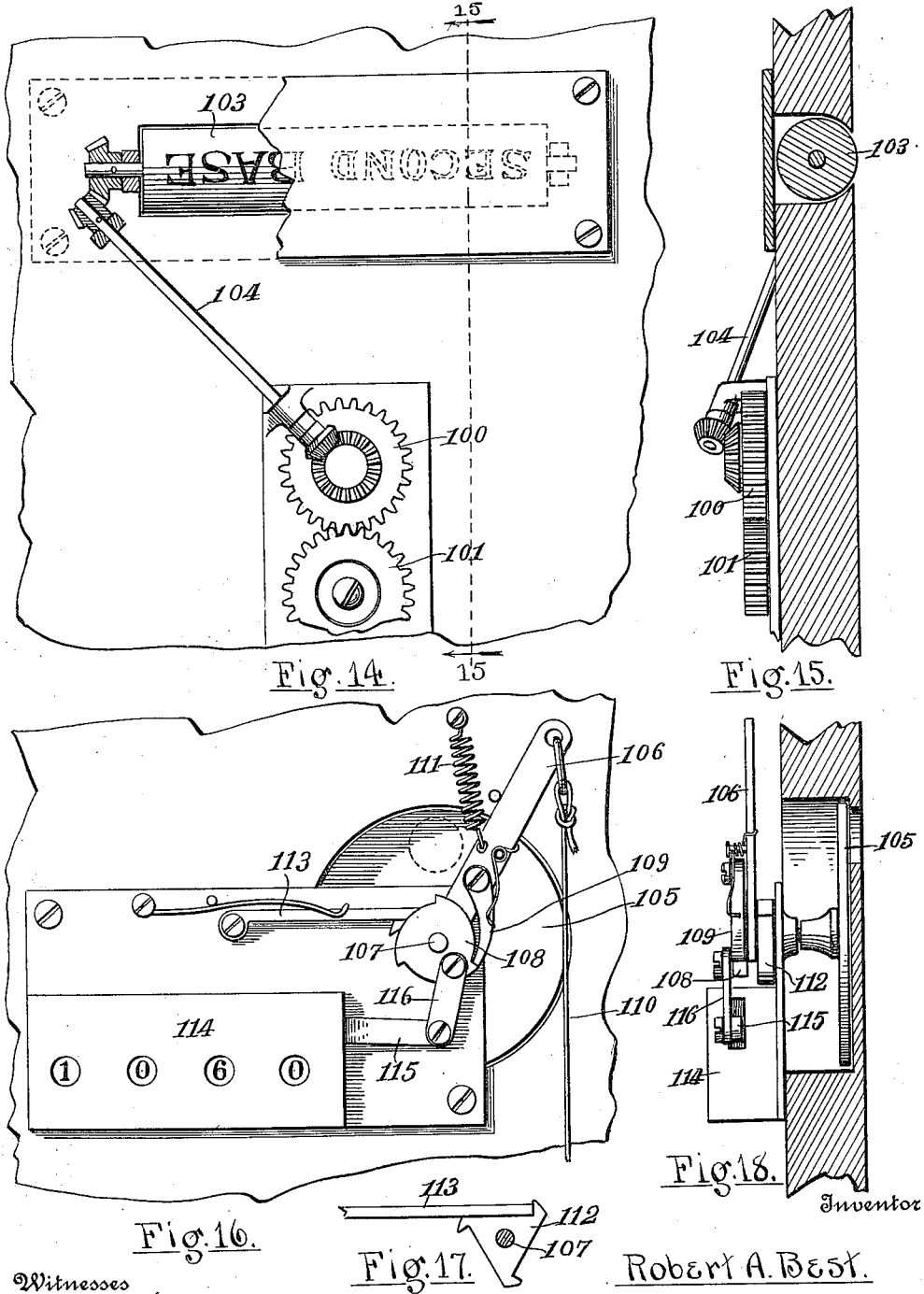

UNITED STATES PATENT OFFICE.

ROBERT A. BEST, OF GRAND RAPIDS, MICHIGAN.

AMUSEMENT DEVICE.

1,069,522.  Specification of Letters Patent.  Patented Aug. 5, 1913.

Application filed September 4, 1912. Serial No. 718,461.

*To all whom it may concern:*

Be it known that I, ROBERT A. BEST, a citizen of the United States of America, residing at Grand Rapids, in the county of Kent and State of Michigan, have invented certain new and useful Improvements in Amusement Devices; and I do hereby declare the following to be a full, clear, and exact description of the invention, such as will enable others skilled in the art to which it appertains to make and use the same.

My invention relates to improvements in amusement devices and more particularly to such devices as represent a base ball game, and its object is to provide a device of the class described provided with a miniature representation of a base ball diamond with movable representatives of respective players located thereon, the batter being arranged to traverse from base to base and the pitcher and umpire adapted to turn and face the batter as he moves, the mechanism for producing these movements being operated by striking a full size base ball which is mounted on an arm on a rotative shaft, this shaft being connected to mechanism properly located relative to the miniature diamond and connected to the various movable parts of the device. The device is also provided with an electric light located at each base on the diamond, which lights are automatically switched on and off as the runner passes the bases. A dial and index automatically operated are also provided which indicate the position of the base runner. A manually operated dial and counter also indicates the number of strikes at the ball that the player makes. The device is also provided with various new and useful features of construction and arrangement, all as hereinafter more fully described and particularly pointed out in the claims, reference being had to the accompanying drawings in which:—

Figure 5:
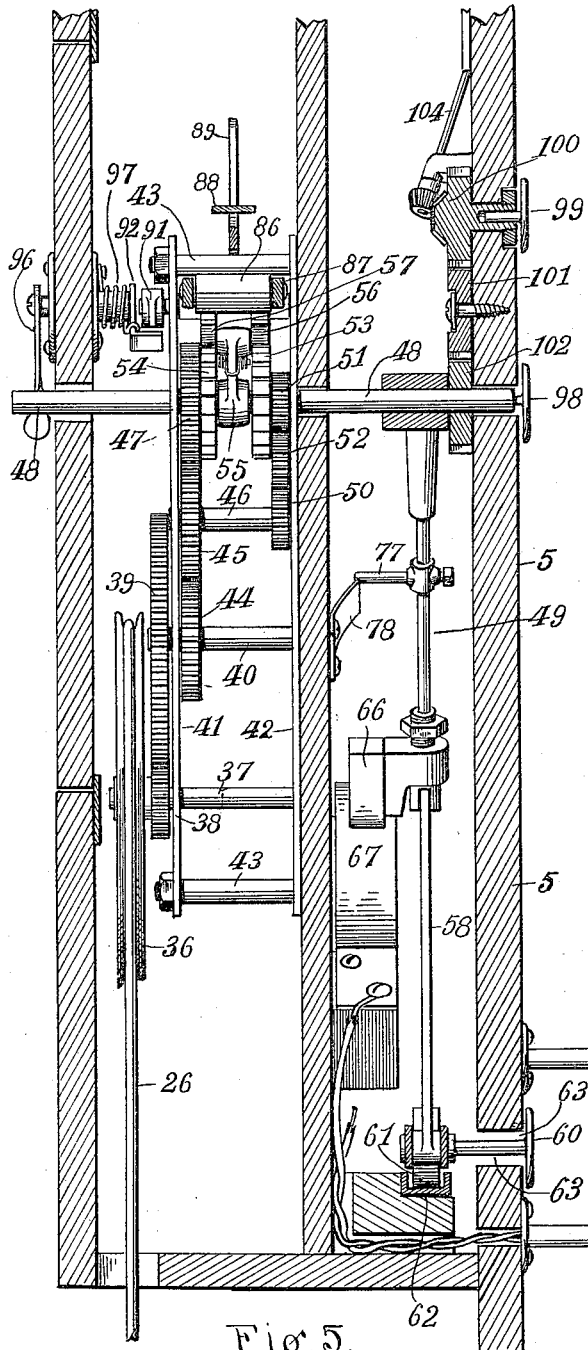
Figure 6:
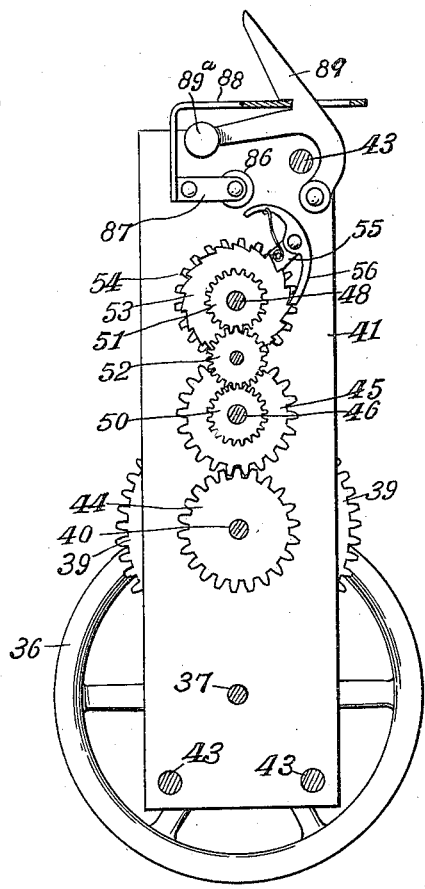
Figure 7:
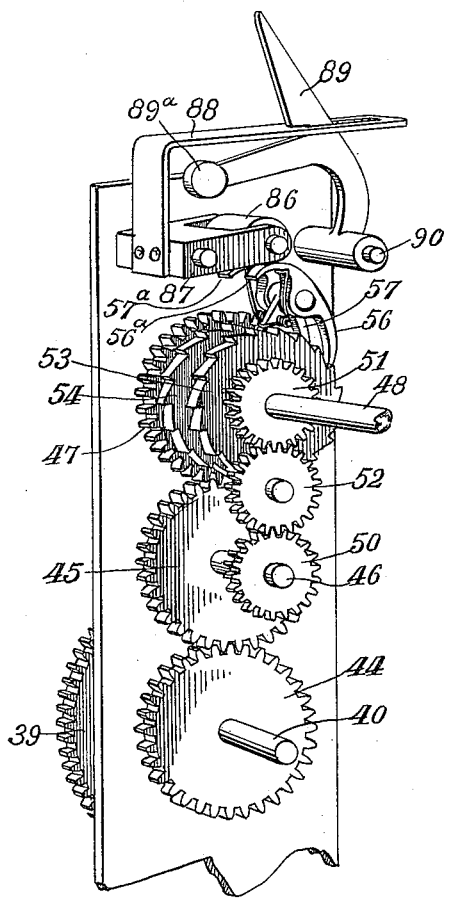
Figure 19:
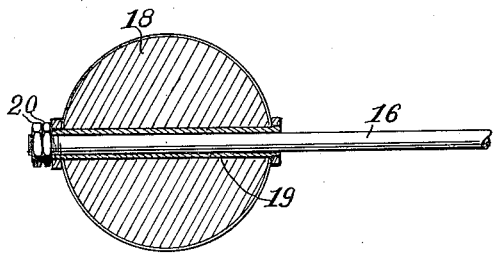
Figure 20:
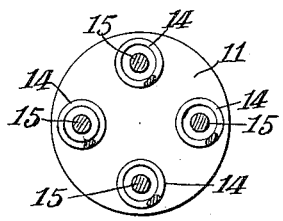
Figure 8:
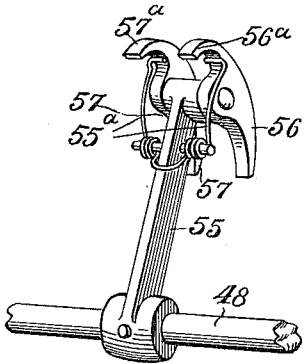

Figure 1 is a perspective view of a device embodying my invention. Fig. 2 is an enlarged sectional detail of the vertically disposed rotative drive shaft and parts related thereto. Fig. 3 a sectional plan on the line 3—3 of Fig. 2; Fig. 4 is an enlarged elevation of the mechanism at the back of the diamond. Fig. 5 is a vertical section through the diamond and casing with portions of the gearing in elevation. Fig. 6 is an elevation of the gearing, shown at right angles to the same in Fig. 5; Fig. 7 is a perspective detail showing the construction and arrangement of the rotating mechanism. Fig. 8 is a perspective detail of the shaft and pawl arm. Fig. 9 is a front elevation of the case directly behind the diamond, showing the rotative arm and wiring diagram for the lights; Fig. 10 is an enlarged detail of one end of the rotative arm; Fig. 11 is a plan view of one of the friction and electrical contact springs; Fig. 12 is a side view of the same; Fig. 13 is a sectional detail illustrating the manual trip lever; Fig. 14 is a sectional detail of the indicating dial and operating means viewed from the rear; Fig. 15 is a section on the line 15—15 of Fig. 14; Fig. 16 is a rear view of the manually operated counter and strike indicating dial; Fig. 17 is a detail of the adjusting and holding block on the shaft of the dial; Fig. 18 is a vertical section through the axis of the dial shaft; Fig. 19 is an enlarged section of the base ball attached to the end of the arm; and Fig. 20 is a section on the line 20—20 of Fig. 2.

Like numbers refer to like parts in all of the figures.

1 represents the base of the frame which is shaped like an elongated box and has a transversely extending support 2 at each end. This base member is provided with a vertical drive shaft 3 at one end, and a hollow pedestal 4 extends upward from its rear end which latter supports the diamond 5, the operating mechanism is contained in a case at the back of the diamond. The drive shaft 3 rotates in a tubular case 3ᵃ and is journaled in bearings 6 near the respective ends of the case, the case being supported by stay rods 7 which are attached to a plate 8 which surrounds the upper bearing 5, and extend outward and downward to the frame and are attached thereto. A short arm 9 is adjustably mounted on the shaft 3 and is held in position on the shaft by means of a set screw 10. The outer end of the arm 9 is provided with a disk 11 and a similar disk 12 carries a socket member 13 and is opposite to and spaced apart from the disk 11. Coiled springs 14 are interposed between these disks and connecting bolts 15 pass through the springs and through the openings in the disks and thus form a connection or joint which will yield in any direction to any sudden shock given the outer end of the arm.

The arm 16 (which is preferably a solid rod) is inserted in an axial opening in the socket 13. The inner end of the rod 16 is provided with a recess 16a and a screw 17 in the socket extends into the recess and thus holds the rod firmly in place. The inner end of the socket member 13 is threaded over the set screw 17 so that when the socket is screwed in place in the disk 12 the set screw can not be removed.

The ball 18 on the outer end of the arm 16 is preferably an ordinary base ball provided with an opening through its center bushed with a metallic tube 19 to strengthen it, and a lock nut 20 on the end of the arm prevents the ball from sliding off the same. The ball is free to move on the arm, but is normally moved outward against the nut 20 by centrifugal force as the arm rotates.

The lower end of the drive shaft 3 extends through the bearing 6 into the base and carries a pulley 21 on its lower end, the shaft being flattened where it enters the pulley and the opening in the pulley also having flattened sides so that the sheave will rotate with the shaft. The extreme lower end of the shaft 3 is reduced in diameter and projects through the bottom of the base 1. A spring 22 and washers 23 are held in place on the lower end of the shaft by nuts 24 and prevent the shaft from rising. The pulley is preferably mounted on a thrust bearing 25, and is provided with ribs 21 alternately disposed to crimp the belt 26, and prevent its slipping on the pulley. The belt extends under idler pulleys 27; thence upward through the hollow pedestal 4 and drives the rotating mechanism at the back of the diamond. The idler pulleys 27 are mounted on a shaft 28 which swings on arms 29 about the rod 30. The rod 30 is fixed in the base of the machine and has a drum 31 loosely mounted upon it and a coiled spring 32 which surrounds the drum and has one end attached to it engages the shaft 28 and normally depresses the same together with the idler pulleys 27 which automatically takes the slack out of the belt 26. The drum 31 is provided with arms 33 extending radially from it at intervals and a rod 34 is adapted to be hooked into openings near the ends of these arms to rotate the drum to adjust the tension of the spring by means of a wing nut 35 on the rod.

The belt 26 drives the operating mechanism located at the rear of the diamond, and for this purpose engages a pulley 36 and rotates it when the drive shaft 3 is rotated. The pulley 36 is mounted on a shaft 37 on which is fixed a pinion 38 which meshes with a gear 39 mounted on the shaft 40. The shafts 37 and 40 are journaled in a frame which consists of plates 41 and 42 spaced apart and connected by means of shouldered bolts 43. A gear 44 is mounted on the shaft 40 and meshes with a gear 45 fixed on the shaft 46 and this gear 45 meshes with a gear 47 freely rotative on the shaft 48 which shaft is journaled in the frame plates and extends through the housing and diamond.

Fixed on the shaft 46 is a gear 50 which drives an idler 52, which idler in turn drives a gear 51 rotative upon the shaft 48. Attached to the gear 51 is a ratchet wheel 53 and another ratchet wheel 54 is attached to the gear 47. It will be noticed that both ratchets 53 and 54 and gears 51 and 47 are driven from the shaft 46 but owing to the interposition of the idler 52 these ratchets are rotated in opposite directions. The ratchet wheels are spaced apart on the shaft 48 and an arm 55 located therebetween is fixed on the said shaft and carries a pawl 56 to engage the wheel 53 and a pawl 57 to engage the ratchet wheel 54. The teeth on both ratchet wheels are inclined in the same direction so that the shaft 48 is always rotated in one direction, and when one ratchet wheel is driving the other is turning in the opposite direction and the pawl which engages it is moving freely over its teeth. By using this construction it is immaterial which way the drive pulley 36 and drive shaft 3 are rotated, the shaft 48 will turn in one direction only consequently the ball may be struck by either a left hand or a right hand batter.

The casing behind the diamond is divided vertically into two chambers. The chamber next to the diamond contains an arm 49 carried around by the shaft 48, which arm moves the base runner and also the electric contacts in the electric circuits which operate the lights. Pivoted on the rotating end of this arm is a lever 58, the long arm of which extends backward from the direction of rotation and has attached a carriage 59 on which the representation 60 of a base runner is mounted. This carriage is provided with rollers 61 which traverse a channel track 62 located behind the diamond and causes the carriage to run behind a slot 63a in the diamond which slot connects the four bases on the diamond. The base runner is mounted on a pin 63 which extends through this slot and is inserted in a socket in the carriage. The carriage is held in the track 62 by means of a spring 64 which is attached to the end of the lever 58 at one end and to the socket in which the arm 49 is fixed at the other end. As the shaft 48 and arm 49 rotate the carriage 59 will traverse the track 62 and the base runner will move from base to base. As the carriage nears one of the bases its tendency would be to increase its speed as it nears the corner of the track owing to the increasing distance of the track from the axis of the arm, and in order to overcome this tendency of the carriage to run ahead, a fiber shoe 66 is attached to the end of the arm 49 and engages in succession spring terminals 67 respectively located just beyond each corner of the diamond. This spring thus affords an added resistance to the movement of the arm and prevents it from running ahead of the mechanism that drives it as the carriage nears the corner of the track. In addition to governing the movement of the carriage the spring terminals 67 also serve as circuit closers for the base lights. When the shoe on the arm engages a spring it presses the same in contact with the fixed terminal 68 and closes the circuit to the lights opposite the respective base. The wires are so arranged that when the carriage and the base runner are at rest at the home plate the three lights at first, second and third bases are all lighted. For this purpose the spring at the home plate engages three terminals 69, 70 and 71 in the respective circuit of said lights at the first, second and third bases. The electrical circuit is through conductors 72 and 73 which lead from the back of the machine where they are attached to any convenient source of electric supply. The incoming conductor 72 connects with the terminals 68 of the first, second and third bases and also with the spring terminals 67 at the home plate. The conductors 74, 75 and 76 from the base lights connect with their respective spring terminals 67 and also with one of the terminals 69, 70 and 71 at the home plate. The conductor 72 is always in circuit with the lights when the carriage is at the home plate, the spring terminal 67 being depressed and engaging the three terminals 69, 70 and 71 thus closing the circuits for the three lights through the conductors 74, 75 and 76 the current thence follows the spring terminal 67 to the return conductor 73 connected thereto. As soon as the arm begins to rotate this spring terminal is released which breaks the circuit putting out all three base lights. As the carriage nears the first base the shoe on the end of the arm will engage the spring terminal 67 and depress it into engagement with the terminal 68. This closes the circuit to the first base light. As the carriage leaves this base and travels to the next base the shoe will engage the next spring terminal 67 temporarily closing the circuit for the respective light in the same way and repeats the same operation as it passes the next base. When the carriage and the base runner reach the home plate, a pin 77 projecting from the arm 49 engages a spring terminal 78 which will close a bell ringing circuit to ring a bell 79 which indicates that the base runner has reached the home plate. This contact occurs just previous to the time that the base runner reaches the home plate and when the carriage reaches the corner and stops, the pin passes the terminal 78 and breaks the circuit, stopping the ringing of the bell. The current to ring the bell is preferably obtained from batteries which may be conveniently located in the pedestal 4. The conductors 81ᵃ and 80ᵃ leading from these batteries are connected to metallic clamping plates 82 and 83 and the conductors 80 and 81 in the back of the case are connected to bolt plates 84 and 85. By this means the current is conducted from the pedestal to the case at the back of the diamond, which latter is removable without necessitating the disconnection of the conductors, the electric circuit being automatically formed when the case is bolted to the pedestal by means of the bolts which screw into the plates 84 and 85. The conductor 81 is grounded on the frame of the machine thus transmitting the current directly to the pin 77 and the conductor 80 with the bell 79 in circuit is connected to the terminals 78. Should the base ball at the end of the arm be struck hard enough it will rotate the shaft enough to move the base runner from base to base and back to the home plate; should the machine stop when the runner is only a short distance from the home plate the peculiar shape of the spring terminal at the home plate allows the runner to automatically slide in under tension of the spring 64. This spring terminal engages the friction shoe 66 to retard the movement of the carriage throughout only a portion of its length, the spring is then bent downward at the point 67ᵃ to release the shoe and allow the carriage to move forward under tension of the spring 64.

It is desirable to stop the movement of the carriage at the home plate in case the mechanism should still be operating. To do this the pawls 56 and 57 are provided with extensions 56ᵃ and 57ᵃ which engage a cam roller 86 as the carriage nears the home plate which depresses these extensions and releases the pawls from the ratchets and allow the ratchets to rotate freely. The cam roller 86 is journaled in a pivoted block 87 which has an arm 88 turned at right angles to engage a latch 89 to hold the roller in a position where it will engage and depress the extensions 56ᵃ and 57ᵃ. The latch is pivoted on the shaft 90 which is provided with a lever 91 by which the latch may be disengaged from the arm 88. The lever 91 is operated by an arm 92 on a pivoted shaft 93 which extends through the door of the casing. This shaft is pivoted in a tube 94 and is provided with a pin 95 which projects through a slot 94ᵃ in the tube to limit the rotation of the shaft. The shaft is also provided on the outside of the door with an operating lever 96 and a coiled spring 97 holds the lever 92 downward out of engagement with the lever 91 so that the catch 89 will be free to engage the arm 88. In order to throw the pawls 56 and 57 back into engagement with the ratchet wheels 53 and 54 and thus connect the rotating mechanism with the drive shaft 48, the lever 96 on the outside of the casing is manually moved which raises the lever 91 and disengages the latch 89 from the arm 88 and allows the cam roller 86 to rise under tension of the spring 55ª which engages the extensions on the pawls and forces them back into engagement with the ratchet wheels. The machine is then ready for operation and as the ball is again struck and the machine begins to move the pawls will be carried out from underneath the cam roller 86 which drops by gravity and the catch 89 which is provided with a counter balance weight 89ª will reëngage the arm 88 thus holding the cam roller in position to reëngage the extension on the pawls as they come around again.

The shaft 48 extends through an opening in the door of the casing and may be provided with a crank handle (not shown) to manually rotate said shaft to carry the base runner back to the starting point in case the rotation of the drive shaft has failed to do so.

One of the attractive features of this device is the movement of the pitcher and the umpire which will turn and face the base runner as he moves from base to base. This movement is obtained by mounting the pitcher 98 on the end of the shaft 46 and the umpire 99 on the shaft of the gear 100 which is driven through an idler 101 from a gear 102 on the shaft 48. The base runner, pitcher, umpire and all the other players including out fielders, etc., are preferably represented by miniature figures although this is not necessary, simple disks being shown in the drawing.

The automatic indicator which shows the position of the base runner consists of a cylinder 103 which is rotatably mounted in a recess in the back of the diamond and an opening through the front of the diamond exposes a part of the surface of the cylinder which is provided with the marking "Batter up" which appears through the opening when the base runner is at the home plate and markings First base, Second base and Third base which appear through the opening consecutively as the base runner passes the respective bases. This indicating cylinder is rotated by means of a shaft 104 from a gear 100 on which gear the umpire is mounted. The number of strikes which the operator makes at the ball are indicated by a dial 105 which is manually rotated and is directly behind the diamond, and an opening is cut through the diamond which consecutively exposes the figures 1, 2 and 3 on the face of the dial. The word "Strike" appears over the opening and the figure on the dial indicates whether it is the first, second or third strike. The means for rotating this dial step by step consists of a lever 106 which is pivoted on the shaft 107 on which the dial is mounted, a ratchet wheel 108 also mounted on the shaft and engaged by a pawl 109 on the lever. A cord 110 is attached to the lever by which the same may be manually moved and a spring 111 returns the lever to its normal position when the cord is released. A triangular block 112 is mounted on the shaft 107 for the purpose of adjusting and holding the shaft in each of its positions. A spring actuated arm 113 engages this block and as the shaft rotates by action of the pawl and ratchet this arm slides from one face of the block to the next and should the shaft not be rotated a complete one-third of its rotation the spring arm will complete the rotation until it engages the face of the block and the end of the arm is opposite a hook shaped extension at each corner of the block to prevent the return movement of the shaft.

A counter 114 which is operated by a lever 115 works in conjunction with the strike indicating dial, its lever being connected to the ratchet wheel 108 by a link 116 and as the disk rotates the lever is worked up and down so that the counter will move one unit for each rotation of the dial which will represent three strikes of the operator.

The extreme outer corners of the diamond are preferably provided with electric lights which are continuously in circuit, the current for these lights being taken from the same circuit by which the outer lights are lighted or from any other convenient source, this being a minor detail and not necessary to the operation of the machine.

In operating the machine the base runner is located at the bottom of the diamond or at the home plate and the pawls in the rotating mechanism are tripped into engagement with the ratchet wheels. In this position the spring terminal 67 at the home plate will be depressed and all three base lights will be in circuit. The operator now strikes the ball at the end of the arm with a base ball bat provided for that purpose which starts the rotation of the drive shaft 3. Any torsion on the arm due to an angular blow on the ball will be yieldably absorbed by the flexible joint carrying the arm, or should the ball be struck endwise of the arm it will slide back on the arm thus preventing damage to the machine. The rotation of the shaft 3 is transmitted to the rotating mechanism at the back of the diamond through the belt 26 and the shaft 48 is driven by means of a pawl which engages one of the ratchet wheels 53 and 54. As before described it makes no difference which way the shaft 3 rotates the shaft 48 being always driven in the same direction by means of the above mentioned oppositely rotating ratchet wheels and the pawl arrangement. As this shaft rotates it moves the arm 49 which in turn moves the carriage on the track 62 and causes the base runner to traverse from base to base on the diamond. As the base runner moves from one base to the other the shoe 66 on the diamond 49 engages the spring terminals 67 to govern the movement of the carriage and also to close the light circuits of each base as the runner passes the same. If the ball is not struck with sufficient force the device will stop before the runner has completed the circuit of the four bases. In this case the shaft 48 is manually rotated by means of a handle which may be attached to its rear end to bring the device to the starting point, but should the blow be sufficient to keep the device operating the base runner will automatically travel back to the starting point and stop there. The pin 77 on the arm 49 will pass over the spring contact plate 78 ringing the bell thus indicating that the runner has completed the circuit and should the mechanism still continue to operate the arms 58ᵃ and 57ᵃ on the pawls 56 and 57 will engage the cam roller 86 and release the pawls from the ratchet wheels thus allowing the shaft 48 to remain idle. Should the operation of the mechanism cease when the base runner is within a short distance of the home plate (preferably within about three inches) the carriage will move forward and carry the same to the starting point which is the depressed portion of the spring terminal 67 opposite the home plate. During the movement of the base runner the pitcher and umpire have rotated face to face and the base cylinder 103 has also rotated disclosing its markings to indicate the position of the base runner. The attendant of the machine manually pulls the cord 110 to indicate the number of strikes at the ball that the operator has made, the counter attached to the strike indicator being advanced one unit for each strike of the operator.

To support the central part of the diamond in place U shaped brackets or bridges 117 span the slot preferably at the bases and the respective electric lights 118 are mounted thereon.

What I claim is:—

1. An amusement device comprising a miniature representation of a base ball diamond, movable figures on the diamond representing the players of a base ball game, mechanism for moving said figures, and a ball connected to said mechanism and adapted to operate the same when put in motion.

2. An amusement device, comprising a miniature representation of a base ball diamond, movable figures representing various players of a base ball game mounted on the diamond, mechanism to move said figures, and a ball connected to said mechanism and adapted to operate the same when put in motion by striking said ball with a bat.

3. An amusement device, comprising a miniature representation of a base ball diamond having a slot therein, figures representing the various players of a base ball game, the figure representing the base runner being mounted on a movable support adapted to traverse the circuit of the bases, and means for moving said support operated by the momentum of a ball when the latter is struck by a bat.

4. An amusement device comprising a miniature representation of a base ball diamond, movable figures representing the players of a base ball game on said diamond, a rotative shaft connected to one or more of said figures to move the same, an arm mounted on said shaft, and a ball mounted on the movable end of the arm to rotate the shaft when the said ball is set in motion by the stroke of a bat.

5. An amusement device, comprising a miniature representation of a base ball diamond and of the various players of a base ball game, the base runner, the umpire and the pitcher being movable figures, rotative mechanism carrying said figures, gearing to operate said mechanism, a rotative shaft connected to said gearing to operate the same, an arm on said shaft, and a ball on said arm adapted to operate the said mechanism when put in motion by striking the same with a bat.

6. An amusement device, comprising a miniature base ball diamond having a slot extending in a circuit from the home plate through the bases and back to the home plate, a support adapted to traverse the slot, a figure representing a base runner mounted on the support, mechanism for moving the support throughout the circuit of the slot starting from the home plate and returning to the same, a rotative shaft connected to the support to move the same, an arm on the shaft, and a ball on the arm to operate the device when said ball is put in motion by the stroke of a bat.

7. An amusement device, comprising a miniature representation of a base ball diamond having a slot therein extending in a circuit from the home plate through the bases back to said plate, a support adapted to traverse said slot, a rotative shaft extending through the diamond, figures on the support and shaft representing players of a base ball game, means for operating the support and shaft, a rotative shaft connected to said means, an arm on the shaft, and a ball on the arm to operate the same when said ball is struck by a bat.

8. An amusement device, comprising a miniature base ball diamond having a slot extending in a circuit through the home plate and bases, a support adapted to traverse the slot, two rotative shafts extending through the diamond, figures representing the base runner, the pitcher, and the umpire mounted respectively on the support and shafts, mechanism adapted to simultaneously move the support and rotate the shafts, and a base ball connected to said means, and operating the same by its momentum when struck by a bat.

9. An amusement device, comprising a miniature representation of a base ball diamond and movable figures thereon representing the players of a base ball game, a rotative shaft connected to said figures to move the same, an arm attached to said shaft and provided with a flexible joint, and a base ball on the movable end of the arm to rotate the shaft by its momentum when struck by a bat.

10. An amusement device, comprising a miniature representation of a base ball diamond and movable figures thereon representing the players of a base ball game, a rotative shaft connected to said figures to move the same, a transversely divided arm attached to said shaft, disks fixed on the divided ends of said arm and spaced apart, springs between said disks, bolts movably connecting said disks, and a base ball on the outer end of said arm.

11. An amusement device, comprising a miniature representation of a base ball diamond and movable figures thereon representing the players of a base ball game, a rotative shaft connected to said figures to move the same, an arm fixed on said shaft, and a base ball slidably mounted on the movable end of the arm to operate the same when said ball is struck by a bat.

12. An amusement device, comprising a miniature base ball diamond and movable figures thereon representing the players of a base ball game, a rotative shaft connected to said figures to move the same, an arm fixed on said shaft and transversely divided disks on the respective divided ends of the arm and spaced apart, bolts movably connecting said disks, springs surrounding the bolts and yieldably engaging the disks, and a base ball slidably mounted on the outer end of the arm to operate the same.

13. An amusement device, comprising a miniature representation of a base ball diamond and movable figures thereon representing the players of a base ball game, a rotative shaft connected to said figures to move the same, a flexible arm mounted on the shaft, a base ball slidably mounted on the outer end of the arm and a bushing in the ball slidable on the arm.

14. An amusement device, comprising a miniature representation of a base ball diamond and movable figures thereon representing the players of a base ball game, a rotative shaft connected to said figures to move the same, an arm having a short inner portion fixed on the shaft, a disk on the end of the said portion a second disk opposite the first named disk and spaced apart therefrom, and also having a central screw threaded opening, a socket inserted in said opening and having a set screw also within the opening, a rod inserted in said socket and projecting outward therefrom, and a base ball slidably mounted on the outer end of said rod.

15. An amusement device, comprising a hollow base, a vertical rotative shaft at one end of the base, a hollow pedestal at the other end of the base, a representation of a miniature base ball diamond mounted on the pedestal, figures representing the players of a base ball game on the diamond, gearing at the back of said diamond for moving said figures, means extending through the diamond to connect the gearing and figures, an arm on the upper end of the first named shaft projecting horizontally from the same, a base ball on the outer end of the arm, and means for transmitting motion from the shaft to said gearing to operate the same when the ball is struck by a bat.

16. An amusement device, comprising a hollow base, a tubular support near one end of the base, a rotative shaft journaled in said support a flexible arm on the upper end of the shaft, a base ball on the outer end of the arm, a pulley on the lower end of the shaft and within the base, a hollow pedestal near the other end of the base, idler pulleys in the base beneath the pedestal, a miniature representation of a base ball diamond mounted vertically on the pedestal, movable figures representing the players of a base ball game on the diamond gearing connected to said figures to move the same, a pulley to operate said gearing, and an endless belt engaging all of the said pulleys.

17. An amusement device, comprising a miniature representation of a base ball diamond, movable figures on the same representing players of a base ball game, mechanism for moving said figures, a belt to operate said mechanism, and a tightener for the belt consisting of pulleys engaging the belt, pivoted arms carrying the pulleys, a rotative drum, a spring mounted on the drum at one end and connected to the arms at the other end, an arm on the drum, a rod connected to the arm, and a nut to adjust the rod.

18. An amusement device, comprising a miniature representation of a base ball diamond having a home plate at one corner and bases at the other respective corners, a track at the rear of the diamond extending along the four sides thereof, a carriage traversing the track, a representation of a base runner carried by the carriage, a shaft near the center of the diamond, an arm carried by the shaft, a lever pivoted to the moving end of the arm near one end and connected to the carriage at the other end, and means for rotating the shaft operated by the momentum of a ball when said ball is struck by a bat.

19. An amusement device, comprising a miniature representation of a base ball diamond having a continuous slot connecting the bases and home plate, a support traversing the slot, a representation of a base runner on the support, U shaped brackets spanning the slot to support the central portion of the diamond, electric lights mounted on the brackets, and means for operating said lights.

20. An amusement device, comprising a miniature representation of a base ball diamond, movable figures on the diamond representing respective base ball players, a rotative shaft at the rear of the diamond connected to the figures to move the same, two ratchet wheels spaced apart and freely rotative on the shaft, gearing adapted to simultaneously rotate the said wheels in opposite directions, an arm fixed on the shaft pawls on the arm respectively engaging said ratchet wheels, each adapted to drive the arm in the same direction, and means for operating said gearing adapted to rotate in opposite directions.

21. In an amusement device of the kind described, means for rotating a shaft in one direction only when operated by a shaft rotating in either direction, comprising a driven shaft, two ratchet wheels freely rotative on the same, a gear attached to each ratchet wheel, a driving shaft adapted to rotate in opposite directions, a gear on the said shaft meshing directly with one of the first named gears, and a second gear on the driving shaft connected to the other first named gear through an idler gear, whereby the ratchet wheels are oppositely rotated, and pawls connected to the driven shaft and engaging the wheels to alternately operate and drive said shaft in one direction only.

22. An amusement device, comprising a miniature representation of a base ball diamond, movable figures thereon representing the players of a game of base ball, a shaft rotative in one direction only to move said figures, an arm attached to the shaft at one end, a support for the base runner connected to the other end of the arm, electric lights mounted on the diamond, electric circuits for the lights, and circuit closers operated by the arm.

23. An amusement device, comprising the representation of a miniature base ball diamond, movable figures thereon representing the players of a game of base ball, a shaft rotative in one direction only to move said figures, an arm attached to the shaft at one end, a support for the base runner connected to the other end of the arm, electric lights mounted on the diamond, electric circuits for the lights, and circuit closers operated by the arm to close the circuits in succession when the arm moves.

24. An amusement device, comprising a miniature representation of a base ball diamond, movable figures thereon representing the players of a game of base ball, a shaft rotative in one direction only to move said figures, an arm attached to the shaft at one end, a support for the base runner connected to the other end of the arm, electric lights mounted on the diamond, electric circuits for the lights, and circuit closures operated by the arm to close all of the circuits when the arm is at rest.

25. An amusement device, comprising a miniature representation of a base ball diamond, movable figures on the same representing the players of a base ball game, a shaft rotative in one direction only to move said figures, an arm fixed on the shaft at one end and connected to a carriage at the other end, a base runner mounted on the carriage to traverse the bases an electric light at each base, electric circuits for the lights, and circuit closers for said circuits operated by the arm.

26. In an amusement device representing a base ball game substantially as described the representation of a base runner movable throughout the circuit of the bases from the home plate and back to the same, an electric light at each base and at the home plate, an electric circuit for each light, a spring terminal to close each circuit, an arm to move the base runner and a shoe on the arm engaging the terminals in succession and closing the respective circuits.

27. In an amusement device representing a base ball game substantially as described, the representation of a base runner movable throughout the circuit of the bases from the home plate and back to the same, an arm to move the said runner, an electric light at each base and at the home plate, a normally open electric circuit for each of the lights, a circuit closer for each light near the respective base, circuit closers for all of the lights at the home plate, and a shoe on the arm to operate the circuit closers.

28. In an amusement device substantially as described, an arm adapted to move the base runner throughout the circuit of the bases from and to the home plate, an electric light at each of said bases and at the plate, normally open electric circuits for the lights, spring terminals to close said circuits, a shoe on the arm engaging the terminals in succession to close the circuits and also adapted to retard the movement of the arm as the same approaches the bases.

29. In an amusement device substantially as described, a miniature representation of a base ball diamond having a continuous slot therein, U-shaped brackets spanning the slot to support the central portion of the diamond, a track at the back of the diamond traversing the margin thereof and opposite the slot, a carriage traversing the track and carrying the representation of the base runner on a support extending through the slot, a shaft at the center of the diamond, an arm on the shaft, a lever pivoted to the end of the arm and connected to the carriage, a spring attached to the lever to hold the carriage to the track, electric lights on the brackets, normally open electric circuits for the lights, spring terminals in the circuits, and a shoe on the arm engaging the said terminals to close the circuits.

30. In an amusement device substantially as described, a rotative shaft, an arm on the shaft to move the representation of a base runner throughout the circuit of the bases from the home plate and back again, an electric bell having a normally open circuit, and a circuit closer in said circuit closed by the arm as the runner nears the home plate on returning thereto.

31. In an amusement device of the class described, a shaft to operate means for moving the figures representing the players, a shaft carrying an arm on which is a base ball adapted to rotate in opposite directions, and means for connecting said shafts whereby the last named shaft rotates the first named shaft in one direction only.

32. In an amusement device of the class described a miniature representation of a base ball diamond, movable figures representing a base runner, a pitcher, and an umpire, a shaft projecting through the diamond near the middle thereof and carrying the pitcher, and rotating the same, a gear carrying the umpire and connected to said shaft to rotate the same in unison with the shaft and an arm on said shaft connected to the base runner to move the same.

33. In an amusement device of the class described, a representation of a base ball diamond, movable figures representing a base runner, a pitcher, and an umpire, a shaft projecting through the diamond near the middle carrying the pitcher and rotating the same, a gear carrying the umpire and connected to said shaft to rotate in unison with the same, an arm on said shaft connected to the base runner to move the same, electric lights at the bases and home plate, normally open electric circuits for the lights, and circuit closures for said circuits operated by the arm.

34. In an amusement device of the class described, a shaft to move the movable figures of the players, driving mechanism connected to said shaft by a pawl, and means for tripping the pawl out of action when the shaft has completed one cycle of operation.

35. In an amusement device of the class described, a shaft to move the movable figures of the players, two ratchet wheels rotative on said shaft, means for driving said wheels in opposite directions a pawl connected to the shaft and adapted to alternately engage the ratchet wheel to drive the shaft in one direction only, and a member adapted to be moved into the path of the pawls to disengage the same when the shaft shall have made one complete revolution.

36. In an amusement device of the class described, a rotative shaft to operate movable figures representing players of a base ball game, a ratchet wheel rotative on the shaft, gearing to rotate the wheel, an arm fixed on the shaft, a pawl to engage the wheel and having a rear extension, a pivoted block carrying a roller to engage the said extension and release the pawl, and a latch to hold the block in operative position.

37. In an amusement device of the class described, a rotative shaft to operate movable figures representing players of a base ball game, a ratchet wheel rotative on the shaft, gearing to rotate the wheel, an arm fixed on the shaft, a pawl to engage the wheel having a rear extension, a pivoted block carrying a roller to engage the said extension and release the pawl, a latch to hold the block in operative position, and means for manually releasing the latch to permit the pawls to reëngage the ratchet wheels.

38. In combination with an amusement device of the class described, a rotative cylinder partially exposed through an opening and having legends thereon indicating the respective bases successively exposed through said opening as the cylinder rotates, a rotative shaft connected to the figure of the base runner to move the same throughout the circuit of the bases, and gearing connecting the shaft and cylinder to rotate the same synchronously.

In testimony whereof I affix my signature in presence of two witnesses.

ROBERT A. BEST.

Witnesses:
   LUTHER V. MOULTON,
   MAE RANKIN.

---

Copies of this patent may be obtained for five cents each, by addressing the "Commissioner of Patents, Washington, D. C."